No. 642,044. Patented Jan. 23, 1900.
W. H. LAWRENCE & R. KENNEDY.
MILKING APPARATUS.
(Application filed Apr. 27, 1896.)

(No Model.) 2 Sheets—Sheet 1.

Witnesses:

Inventors
William H. Lawrence
and Robert Kennedy
By their attorneys
Howson & Howson No. 642,044. Patented Jan. 23, 1900.
W. H. LAWRENCE & R. KENNEDY.
MILKING APPARATUS.
(Application filed Apr. 27, 1896.)
(No Model.) 2 Sheets—Sheet 2.

UNITED STATES PATENT OFFICE.

WILLIAM HENRY LAWRENCE AND ROBERT KENNEDY, OF GLASGOW, SCOTLAND.

MILKING APPARATUS.

SPECIFICATION forming part of Letters Patent No. 642,044, dated January 23, 1900.

Application filed April 27, 1896. Serial No. 589,263. (No model.)

*To all whom it may concern:*

Be it known that we, WILLIAM HENRY LAWRENCE and ROBERT KENNEDY, subjects of the Queen of Great Britain and Ireland, and residents of Glasgow, Scotland, have invented certain Improvements in Milking Apparatus, of which the following is a specification.

This invention relates to milking apparatus in which suction is employed to draw the milk from cows' teats; and its object is by improved apparatus to impart a pulsating action in a better and more convenient manner than has been hitherto accomplished.

In carrying out the invention the suction may be produced by pumping apparatus or by any other suitable known kind of apparatus, such apparatus being placed at any convenient distance from the place where the milking operation is to be conducted. Instead of producing the pulsation by direct mechanical appliances forming part of the suction-producing apparatus separate portable pulsating apparatus is employed and may be applied near one cow or near a set of two or more cows, so that the action is not altered or rendered inefficient because of taking place through a considerable length of piping. It is also a distinguishing feature of the improved apparatus, which may be termed a "pneumatic pulsator," that it is worked by means of the suction itself in conjunction with atmospheric air, the actions of the two being controlled by automatic appliances comprising a cylinder and piston or equivalent, together with ports and passages, and valve details and other parts.

The constructive details of the improved pulsating apparatus and the arrangements of the parts may be varied without departing from the characteristic peculiarities of the invention, which are embodied in an example shown upon two accompanying sheets of explanatory drawings.

Figure 1:
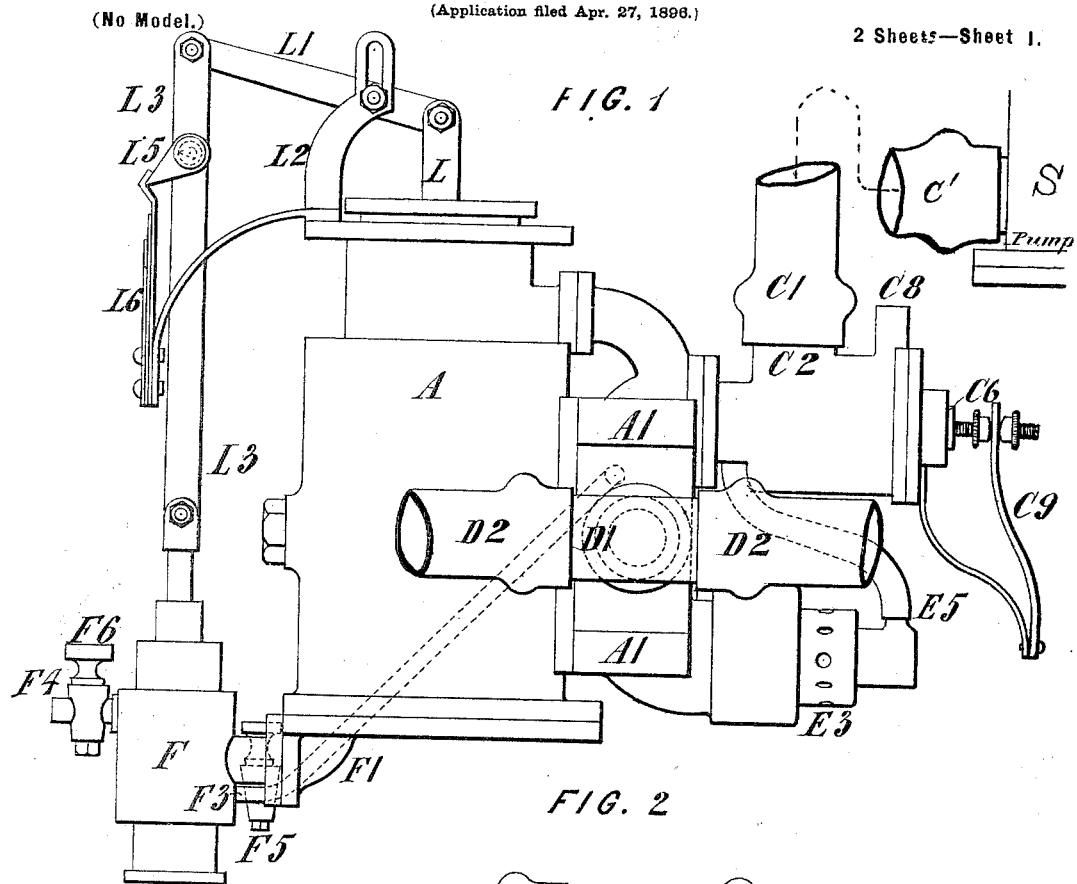
Figure 2:
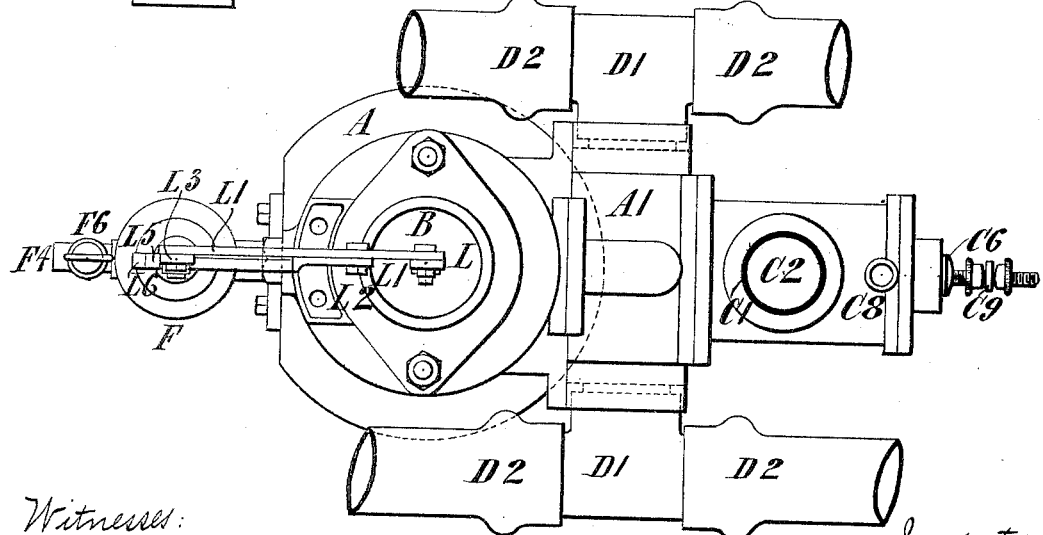
Figure 3:
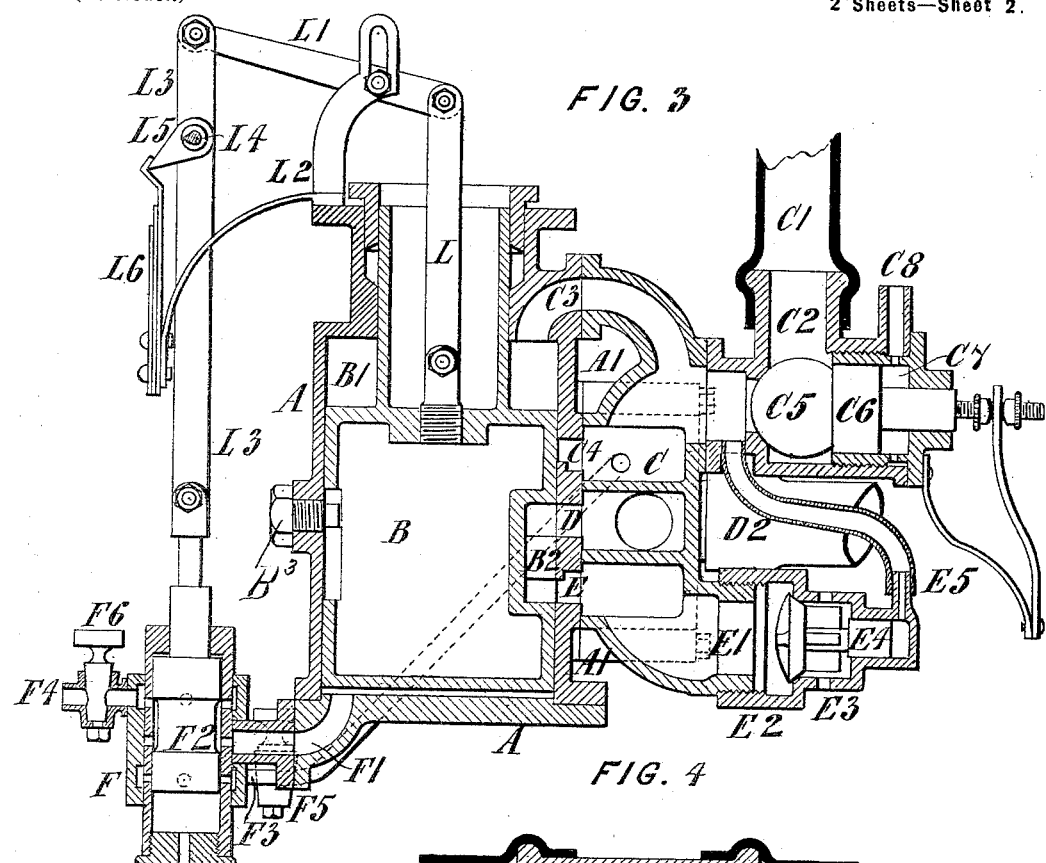
Figure 4:
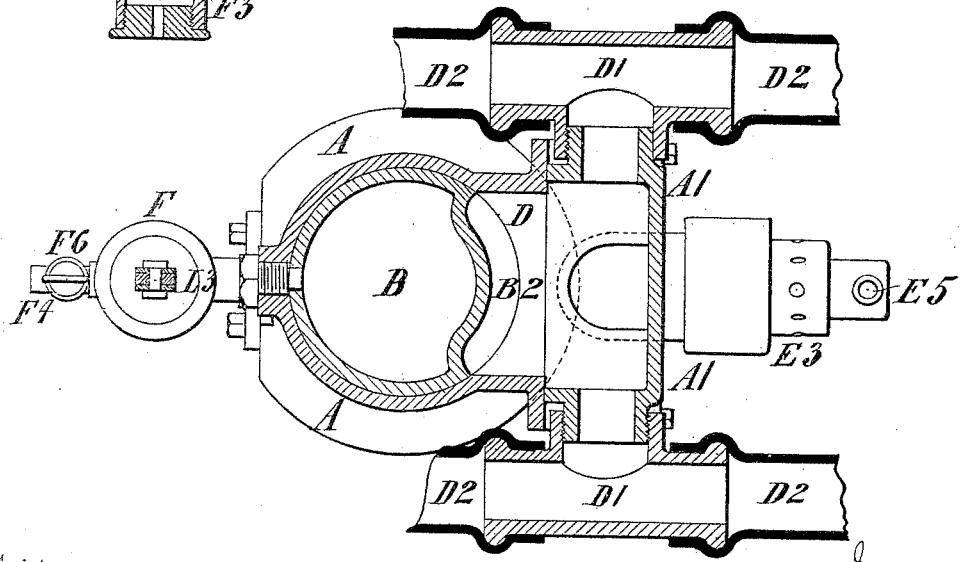

Figures 1 and 2 of the drawings are a side elevation and a plan of one example, and Figs. 3 and 4 are vertical and horizontal section of the same.

As shown in the drawings, the cylinder A has working in it a piston B, which is of an elongated form and is made with a trunk B', working through a stuffing-box in the cylinder end, so that the effective area of the piston is smaller at one end than at the other. The main or a branch suction-pipe from the suction-producing apparatus of any suitable form, such as the pump S, (shown in Fig. 1,) is by a rubber tube C', coupled to a nozzle $C^2$, put in communication with a suction-space C, formed in a casting A', forming part of or fixed to the cylinder A, and the annular or smaller piston-area is always in communication with the suction-space C by a passage $C^3$. The piston B is at about its middle part made with a recess or cavity $B^2$ in its side, which acts like that of an ordinary slide-valve in relation to three ports $C^4$, D, and E, formed in the cylinder-shell. The middle port D is connected to the milk-pails with which the apparatus is to work by branch passages and nozzles D', to which rubber tubes $D^2$ are connected, and a second port $C^4$ communicates with the suction-space C, while the third port E communicates with an air-inlet passage E', having in it a valve $E^2$. The cylinder end having the larger effective area is in communication by a passage F' with a small valve-box F, having in it a piston-valve $F^2$, which is worked by tripping or tappet mechanism (hereinafter explained) from the main piston B, and this valve $F^2$ puts the (larger) cylinder end in communication alternately with the suction-space C through a pipe or passage $F^3$ and with the atmosphere by another pipe or passage $F^4$. Stop-cocks $F^5$ $F^6$ are fitted to these passages for regulating the flow through them.

In one position of the parts the larger piston end is acted on by the atmosphere or by a regulated pressure somewhat higher than that in the suction-space C, and the piston B moves toward the stuffing-box or trunk end of the cylinder A. This makes the port $C^4$ of the suction-space C communicate through the cavity $B^2$ of the piston with the port D, which communicates with the milk-pails, and then the greater degree of suction operates. At the same time the movement of the piston on completing its stroke causes the shifting of the valve $F^2$, in consequence of which the larger piston end is put in communication with the suction-space C, and then the atmosphere acting on the trunk area of the piston B makes the piston return to the other end of the cylinder. In this position of the piston B the port, D communicating with the milk-pails, is in communication with the air-inlet port E, and the degree of suction is diminished. The actions described are continually repeated automatically, with the result of producing the desired pulsation, and this pulsating action can be varied in many respects by adjusting the parts and adjusting the extent of opening through the various passages. The piston B is prevented from turning about its axis by a groove in its side and a pin $B^3$, fixed in the cylinder and projecting into the groove.

What has been referred to as the "air-inlet" valve $E^2$ is arranged so as to prevent such a large ingress of air as would reduce the degree of internal suction too much or cause the teat-cups to drop from the cows' teats. The valve $E^2$ is arranged to open inward, the air having access to it through holes in the box $E^3$, but has fixed to it a plunger or piston $E^4$, working in a cylindrical part of the box $E^3$, the farther end of which is in communication by a pipe $E^5$ with the suction-space C. This piston $E^4$ tends to close the air-inlet valve $E^2$ and does so as soon as so much air enters past the valve as will diminish the degree of suction to the desired minimum.

In connection with the suction-space C there may be arranged, as shown in Fig. 3, a valve $C^5$, operating to some extent like a reducing-valve to prevent variations in the degree of suction produced by the suction-producing apparatus from objectionably affecting the action of the pulsator. This valve is moved to and from its seat by a differential piston $C^6$, working in a small chamber, the smaller port or plunger working through an aperture in the cover, so as to be acted on by the atmosphere. The annular space $C^7$ between the cover and larger part of the piston $C^6$ communicates through a pipe $C^8$ with the suction-space C. An adjustable spring $C^9$, Fig. 1, may be applied to the plunger part of the piston $C^6$. An increase of suction tends to close the valve $C^5$, and vice versa.

In order to reduce to a minimum the possibility of the pulsator-piston B stopping in a position in which the pressures acting on it are momentarily in equilibrium, the action on the valve $F^2$ is transmitted through tripping or tumbler gear. The piston B is connected by a link L to a lever L', having its fulcrum-pin working in a slot in a fixed bracket $L^2$, so that the lever operates only when near either end of the stroke. The other end of the lever L' is connected by a link $L^3$ to the valve $F^2$, and on the link there is a pin $L^4$, which acts in an aperture in a tumbling-piece $L^5$, pressed in one direction by a spring $L^6$, on which it bears with a knife-edge. When the link $L^3$ is moved in either direction, it first turns the tumbling-piece $L^5$ partly over on its knife-edge and in doing so presses out the spring $L^6$; but on the middle point being reached the spring $L^6$ reacts and, through the tumbling-piece $L^5$, makes the link $L^3$ complete its stroke.

Parts of the pulsating apparatus hereinbefore described are obviously susceptible of slight modification.

What we claim is—

1. An automatic pulsating mechanism for milking apparatus operated by suction, provided with pneumatic means for operating the same to intermittently alter the pressure or degree of suction in the pipes connected to the milk-pails, substantially as described.

2. In milking apparatus by suction, the combination with the suction apparatus, of an automatic pulsating apparatus, and pneumatic means for operating the same to intermittently alter the pressure or degree of suction in the pipes connected to the milk-pails, substantially as described.

3. In milking apparatus operating by suction, the combination with the suction apparatus, of pipe connections to the suction apparatus and to the milk-pails, with an interposed pneumatic pulsating apparatus comprising a valve mechanism actuated automatically by the suction itself to intermittently alter the pressure or degree of suction in the pipes connected to the milk-pails, substantially as set forth.

4. In milking apparatus, the combination with the suction apparatus, of pipe connections to the suction apparatus and to the milk-pails with an interposed pneumatic pulsating apparatus, comprising a cylinder and a piston and valve adapted to alternately connect the passage to the milk-pail with the suction and with the atmosphere, passages connecting each end of the cylinder with the suction-pipe and a valve in one of the said passages actuated by the movement of the piston, all substantially as set forth.

In testimony whereof we have signed our names to this specification in the presence of two subscribing witnesses.

WILLIAM HENRY LAWRENCE.
ROBERT KENNEDY.

Witnesses:
EDMUND HUNT,
DAVID FERGUSON.